Sept. 29, 1953    G. E. GLISS    2,653,352
EXTRUDER
Filed Dec. 28, 1951
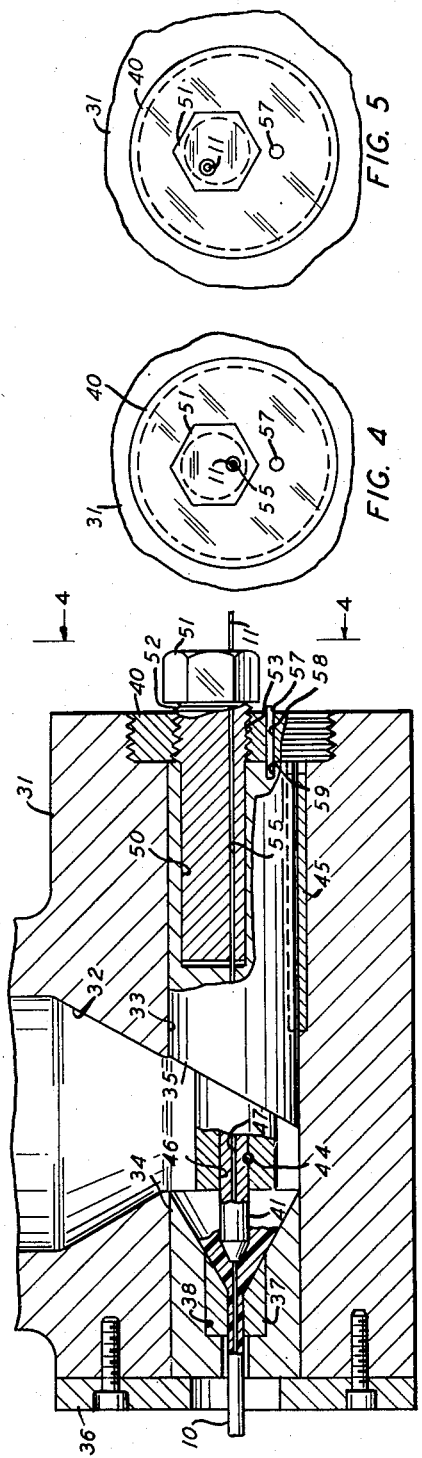
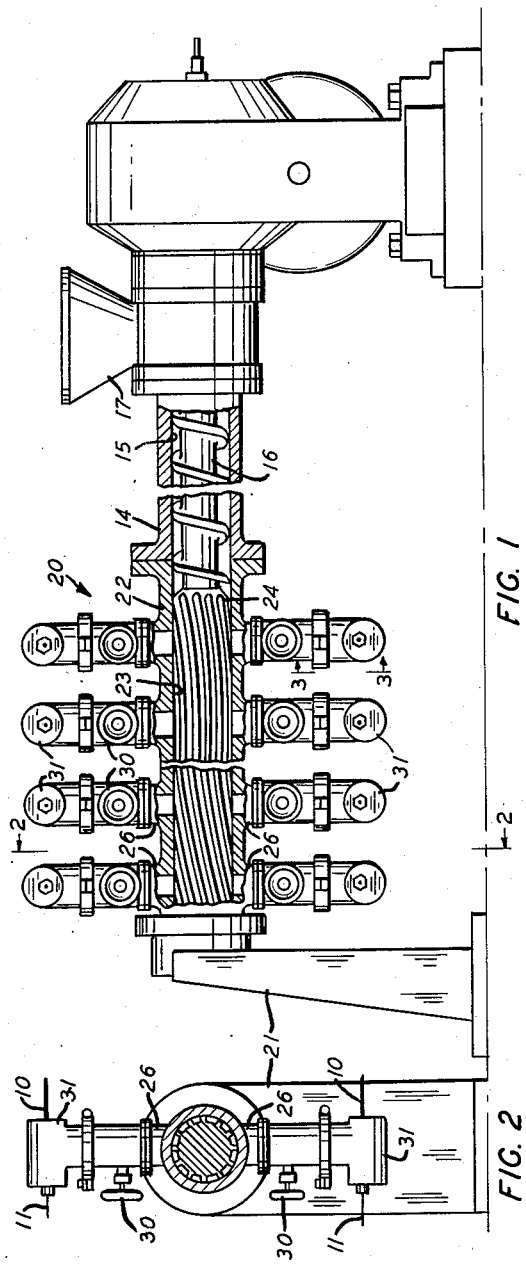
INVENTOR
G. E. GLISS
BY
ATTORNEY Patented Sept. 29, 1953

2,653,352

UNITED STATES PATENT OFFICE 2,653,352

EXTRUDER

George E. Gliss, Baltimore, Md., assignor to Western Electric Company, Incorporated, New York, N. Y., a corporation of New York Application December 28, 1951, Serial No. 263,726

6 Claims. (Cl. 18—13)

This invention relates to extruders, and more particularly to extruders for individually covering a plurality of conductors simultaneously.

In the manufacture of covered conductors, it has been the common practice to extrude each covering over single or dual conductors with a single extruder. However, in covering wires having small conductive cores with relatively thin insulating coverings, it has not been economically feasible to provide extruders which do not extrude much larger capacities than that required to cover single or double wires. Multiple head extruders have been proposed, but it has been necessary heretofore to stop the entire apparatus when one wire source has run out or a wire has broken to prevent clogging up of the extruding head associated with that wire.

An object of the invention is to provide new and improved extruders.

Another object of the invention is to provide new and improved apparatus for extruding individual coverings on a plurality of conductors.

A further object of the invention is to provide multi-head extruders for simultaneously applying individual coverings on a plurality of conductors.

An apparatus illustrating certain features of the invention may include an extruding head in which a core tube and a die are mounted in alignment. Means are provided in the head for closing off the core tube to prevent leakage of compound when there is no core being advanced through the head.

A complete understanding of the invention may be obtained from the following detailed description of an apparatus forming a specific embodiment thereof, when read in conjunction with the appended drawings, in which Fig. 1 is a front elevation of an apparatus forming one embodiment of the invention;

Fig. 2 is a vertical section taken along line 2—2 of Fig. 1;

Fig. 3 is an enlarged, fragmentary, side elevation, partly in vertical section, of a portion of the apparatus shown in Fig. 1;

Fig. 4 is a fragmentary elevation looking in the direction of the arrows 4—4 in Fig. 3, and Fig. 5 is a view similar to Fig. 4 with some elements of the apparatus shown in different positions from those in which they are shown in Fig. 4.

Referring now in detail to the drawings, there is shown therein a multi-head extruder for extruding individual coverings 10—10 on conductors 11—11 simultaneously. The extruder includes an extruding cylinder 14 having a bore 15 therein, in which is mounted a stock screw 16 having a tapered root. A plastic compound, including as the essential ingredient thereof a thermoplastic material such as, for example, a copolymer of vinyl acetate and vinyl chloride, polyvinyl acetate, polyethylene, polyvinyl chloride, vinylidene chloride or the like, is inserted into the bore 15 through a hopper 17. The screw 16 advances the compound along the cylinder 14 toward the lefthand end thereof, as viewed in Fig. 1, and forces it into an extruding head 20 which is supported at one end by a standard 21.

The extruding head 20 is provided with a cylinder 22 having a bore 23 therein, in which a ribbed stock screw extension 24 is rotatably mounted and fits fairly closely. The extruding head 20 also includes branch conduits 26—26 leading from the top and bottom of the cylinder 22, into which the plastic compound is forced in extrudable condition by the pressure of the screw 16 thereon. Individually adjustable reducing and shutting-off valves 30—30 are connected to the branch conduits 26—26 and to flanged sub-heads 31—31. Each sub-head 31 (Fig. 3) includes a passage 32 leading to a transverse passage 33, in which is mounted a die holder 34 and a core tube holder 35. A retaining plate 36 secures the die holder 34 in the passage 33, and a die 37 is mounted in a counterbore 38 formed in the die holder 34.

An annular, interiorly and exteriorly threaded plug 40 secures the core tube holder 35 in the passage 33, and the core tube holder holds a core tube 41 in properly oriented position with respect to the die 37. A key 45 keys the core tube holder 35 in the passage 33, and a pin 44 secures the core tube 41 against rotation relative to the core tube holder. The core tube holder is provided with a central passageway 46 aligned with a passageway 47 in the core tube through which the conductor 11 may be advanced.

A bore 50 formed in the core tube holder is eccentric with respect to the bore 46, and is designed to receive a plug 51 having a threaded portion 52 threaded into a tapped bore 53 formed in the plug 40. The plug 51 is provided with a passage 55 eccentric to the longitudinal axis thereof, and, when the plug 51 is in one position with respect to the core tube holder 35, the passage 55 is aligned with the passage 46 in the core tube holder. However, when the plug 51 is screwed completely into the bore 50, the end of the plug 51 abuts the end of the bore 50, and the passage 55 is completely offset from the passage 46. A pin 57 projects through a bore 58 formed in the plug 40 into a bore 59 formed in the core tube holder 35 to key the core tube holder to the plug 40 in an oriented position with respect thereto.

Operation

The conductors 11—11 are continuously advanced through the sub-heads 31—31 by suitable means (not shown), and the plastic compound fed into the hopper 17 is continuously advanced along the extruding cylinder 14 and is simultaneously worked and heated to a condition of high extrudability by the stock screw 16 and the stock screw extension 24. The stock screw 16 forces the highly plastic compound into the branch conduits 26—26 through the valves 30—30 and into the sub-heads 31—31, through which the compound flows around the core tubes 41—41 and through the dies 37—37, which form the compound into the coverings 10—10 on the wires 11—11.

In the event of breakage or running out of the conductor 11 of one of the sub-heads 31—31, and it is undesirable to shut down that head, the plug 51 of the head is threaded farther into the bore 50 to seat against the end of the bore 50 in the core tube holder 35. This effectively shuts off flow of the compound back through the core tube 41 and the conductor entrance end of the subhead 31. Then when another conductor is ready, the plug 51 may be turned back to align the passage 55 therein with the passage 46 in the core tube holder 35, and the conductor may be pushed through the plug 51, the core tube holder 35, the core tube 41 and the die 37. Thus, compound is kept out of the conductor entrance ends of the sub-heads during stringing up operations.

The above-described apparatus serves to extrude a multitude of individual coverings on a multitude of small wires with about the same rate of speed for each wire and with the same size of extruder as normally is required to extrude a similar heavier covering over one conductor or another core. Consequently, large savings in equipment and floor space may be effected by this apparatus.

Certain features of the above-described apparatus are disclosed and claimed in copending application Serial No. 263,752, filed December 28, 1951, by G. E. Henning for "Extruder."

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An extruder, which comprises an extruding head having a passage therethrough and also provided with a tapped counterbore at the entrance end of the passage, a die mounted in the delivery end of the passage, a core tube holder having a core passage extending along the axis thereof mounted in the entrance end of the passage, said holder also being provided with a socket at the entrance end thereof eccentric to the axis of the core passage and a counterbore concentric to the axis thereof at the exit end thereof, a core tube mounted in the last-mentioned counterbore, an internally tapped annular plug mounted in the threaded counterbore in the extruding head, and a cylindrical plug having a passage therethrough eccentric to the longitudinal axis thereof threaded through the annular plug into the eccentric socket in the core tube holder, said plugs and said core tube holder being so constructed and arranged that when the cylindrical plug abuts the end of the eccentric socket, the passages in the core tube holder and the cylindrical plug are offset one from another.

2. An extruder, which comprises an extruding head having a passage therethrough, a die mounted in the delivery end of the passage, a core tube holder having a core passage extending along the axis thereof mounted in the entrance end of the passage, said holder also being provided with a socket at the entrance end thereof eccentric to the axis thereof, a core tube held by the core tube holder, a plug having a passage therethrough eccentric to the longitudinal axis thereof mounted rotatably in the socket in the core tube holder, and means selectively operable for holding the plug in a position in which the plug abuts the end of the socket and the passage in the plug is offset from the passage in the core tube holder.

3. An extruder, which comprises an extruding head having a passage therethrough, a die mounted in one end of the passage, a core tube mounted in the other end of the passage provided with a bore and a counterbore at the entrance end thereof eccentric to the bore, and a cylindrical plug having an eccentric bore therein mounted in the counterbore, said plug being selectively movable between a position in which the bore therethrough is aligned with the bore in the core tube and a position closing the bore in the core tube.

4. An extruder, which comprises an extruding head having a passage therethrough, a die mounted in one end of the passage, a core tube mounted in the other end of the passage provided with a bore and a counterbore at the entrance end thereof eccentric to the bore, a cylindrical plug having an eccentric bore therein mounted in the counterbore, and means operable selectively for moving the plug between a position in which the bore therethrough is aligned with the bore in the core tube and a position closing the bore in the core tube.

5. An extruder, which comprises an extruding cylinder having a plurality of lateral outlets, a plurality of extruding heads having T-shaped passages connected to the outlets, a plurality of dies mounted in the passages, a plurality of core tubes having bores therethrough mounted in the passages, said core tubes also being provided with counterbores eccentric to the bores, and a plurality of cylindrical plugs having eccentric bores therethrough mounted rotatably in the counterbores in the core tubes.

6. An extruder, which comprises an extruding cylinder, an extruding head having a T-shaped passage connected to the cylinder, a die mounted in the passage, a core tube having a bore therethrough mounted in the passage, said core tube also being provided with a counterbore eccentric to the bore, and a cylindrical plug having an eccentric bore therethrough mounted rotatably in the counterbore in the core tube.

GEORGE E. GLISS.

References Cited in the file of this patent

UNITED STATES PATENTS

| Number | Name | Date |
|---|---|---|
| 79,896 | Bishop | July 14, 1868 |
| 253,822 | Mignon | Feb. 14, 1882 |
| 1,154,674 | Van Ness | Sept. 28, 1915 |
| 1,646,825 | Kochendorfer | Oct. 25, 1927 |
| 2,452,610 | Sonnenfeld | Nov. 2, 1948 |